July 13, 1926.
A. M. MacFARLAND
1,592,376
THERMOSTAT
Filed July 19, 1921
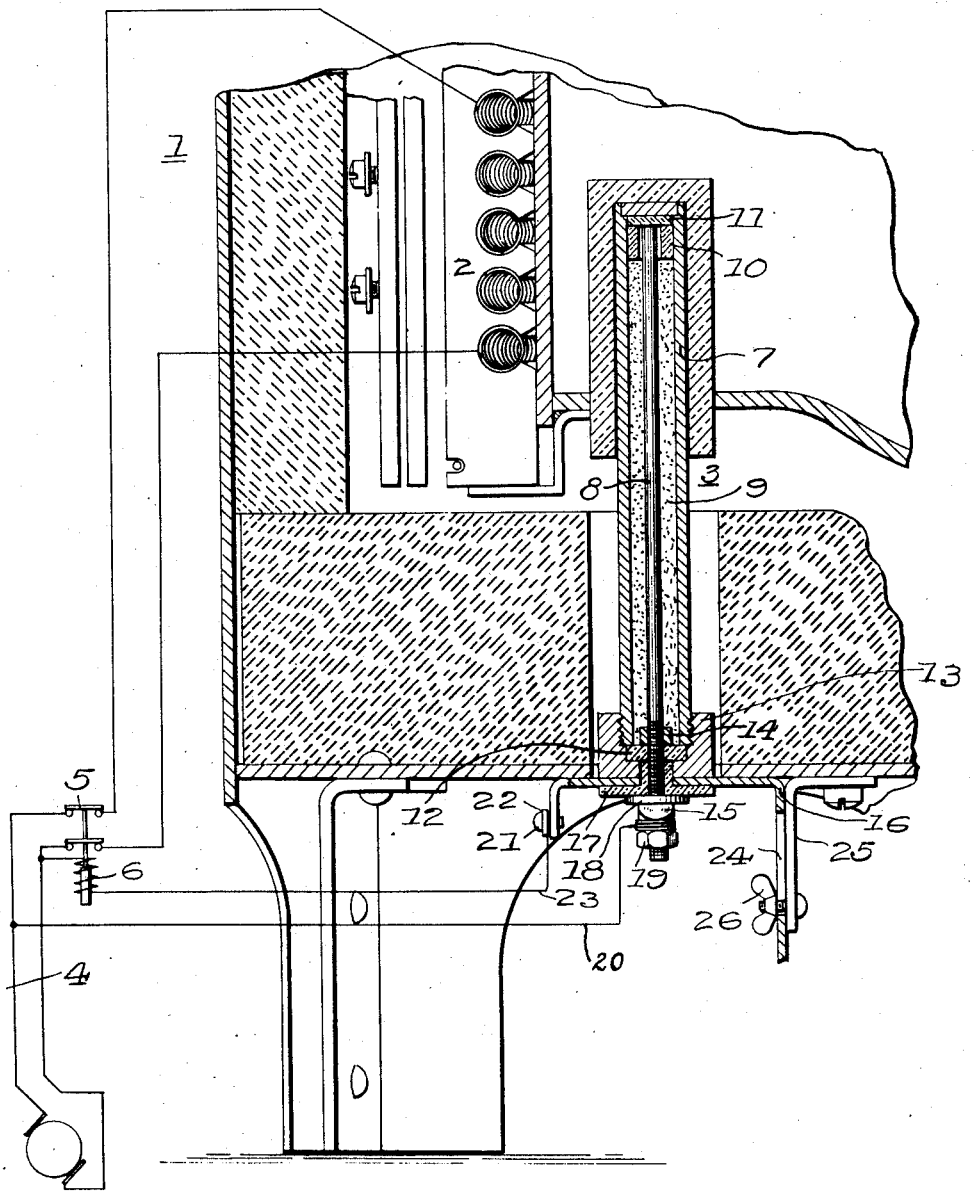
WITNESSES:
INVENTOR
Allis M. MacFarland
BY
ATTORNEY Patented July 13, 1926.

1,592,376

UNITED STATES PATENT OFFICE.

ALLIS M. MacFARLAND, OF PITTSBURGH, PENNSYLVANIA, ASSIGNOR TO WESTING-HOUSE ELECTRIC & MANUFACTURING COMPANY, A CORPORATION OF PENNSYLVANIA.

THERMOSTAT.

Application filed July 19, 1921. Serial No. 485,882.

My invention relates to thermostats and particularly to thermostats of the variable-resistance type.

One object of my invention is to provide a thermostat comprising a fusible material, the resistance of which is adapted to change from a relatively high value at normal temperatures to a relatively low value at relatively high temperatures.

Another object of my invention is to provide a thermostat for controlling an electrical circuit, in which the various elements of the thermostat shall be relatively stationary.

Another object of my invention is to provide a thermostat, of the above-indicated character, in which one portion of the fusible material may be fused upon attaining a predetermined temperature, to which it is subjected, and another portion of which shall operate as a seal to maintain the fused portion within the thermostat.

Another object of my invention is to provide a device, of the above-indicated character, that shall be adapted to be disposed in various positions by reason of the sealing character of the fusible material employed.

Another object of my invention is to provide a thermostat, of the above-indicated character, embodying a unitary structure in which the various elements may be easily and economically constructed and assembled, and which shall be effective and reliable in its operation.

United States patent application Serial No. 337,679, filed by Paul E. Demmler Nov. 13, 1919, and assigned to the Westinghouse Electric and Manufacturing Company, discloses a thermostat comprising a container of conducting material, an electrode disposed therein and a fusible salt disposed around the electrode that is normally non-conducting, but that is adapted, when heated to a predetermined temperature, to decrease in resistance and to become conducting. When the resistance of the material is decreased by reason of its attaining a predetermined temperature, an external circuit controlled thereby may thereupon be completed to effect the operation of auxiliary controlling devices in the external circuit.

In my co-pending application Serial No. 485,881, filed July 19, 1921, and assigned to the Westinghouse Electric and Manufacturing Company, I describe an electrically-heated solder pot, the temperature of which is to be maintained within predetermined limits by means of a salt thermostat which is described in this application.

In practicing my invention, I provide a tubular conducting member containing a metallic rod and a fusible material, such as a salt that is normally non-conducting, but is adapted, when heated to a temperature at or near its fusing point, to become conducting. An enclosing cap for the tubular member embodies a supporting member that serves to support the thermostat and also serves as a terminal for the tubular member.

The metallic rod or electrode is insulated from the tubular member and the cap by suitable insulating washers. One end of the tube is subjected to the temperature of the device, the temperature of which is to be controlled, and the salt at that end of the thermostat becomes conducting when heated to a predetermined temperature at which it may or may not fuse. The other end of the thermostat, being relatively cooler, never attains the fusing temperature and, therefore, acts as a seal for the heated portion of the salt which may have fused. The thermostat may thus be placed in a vertical or horizontal position without danger of the salt leaking from the container.

The single figure of the accompanying drawing is a view, partially in diagram and partially in section, of an electrical circuit and a device for controlling the same that embodies my invention.

In the accompanying drawing is illustrated a heat-storage device 1, such as a furnace or solder pot, that is heated by a heating element 2 and the temperature of which is to be controlled by a thermostat 3. The heating element or resistor 2 obtains its energy from a supply circuit 4 through a circuit interrupter 5. The temperature of the furnace is controlled by the thermostat by controlling the connection of the heater 2 to the circuit 4 to control the amount of energy that may be transmitted thereto. The actuation of the interrupter 5 is controlled by means of an operating coil 6, the circuit of which is controlled by the thermostat 3.

The thermostat 3 comprises, in general, a tubular container 7 of conducting material, a rod 8 of conducting material disposed therein and a salt 9 that is non-conducting at normal temperatures but becomes conducting at a predetermined relatively high temperature.

The rod 8 is insulated from the container 7, at one end thereof, by means of a porcelain bead 10 and a mica washer 11. At the other end of the tubular container 7, the rod 8 is supported by a washer 12 of insulating material that is disposed within the cap 13 and is secured between the tubular member 7 and the cap to prevent movement thereof. The portion of the rod 8 that extends through the cap 13 is threaded to accommodate a plurality of securing nuts 14 and 15.

A metallic supporting bracket 16 is disposed adjacent the cap 13 and is conductively secured thereto in face-to-face relation by the two nuts 14 and 15, that co-operate to prevent relative movement between the cap 13 and the supporting bracket 16. A washer 17 of insulating material is disposed between the metallic bracket 16 and the nut 15 to prevent engagement therebetween, and a metallic washer 18 is employed, whereby pressure may be exerted against the washer 17 without damage to the same by the nut 15.

The cap 13 and the bracket 16 being secured to the rod 8 by means of the nuts 14 and 15, the three elements form a compact unitary structure that may be easily inserted into, and removed from, the tubular member 7. A nut 19 co-operates with the nut 15 to permit an external conductor 20 to be connected to the rod or electrode 8. A small bolt 21 and a washer 22 serve to connect a conductor 23 to the supporting bracket 16, whereby electrical connection is effected between the supply circuit 4 and the container 7.

The bracket 16 is provided with a slotted portion 24 which co-operates with a stationary bracket 25 and an adjusting member 26, such as a wing nut and bolt, to adjust the position of the thermostat with respect to the solder pot 1.

When the heat-storage device 1 and, consequently, the portion of the thermostat disposed therein attain a predetermined temperature value, the portion of the salt 9 that is adjacent the end of the thermostat disposed within the device 1 becomes conducting. A circuit is thereupon completed from the rod or electrode 8 to the tubular container 7, and the operating coil 6 of the interrupter 5 is energized to open the interrupter.

The heater 2 is thereupon disconnected from its supply circuit 4, and the temperature of the device 1 gradually decreases. When the temperature decreases to a value at which the salt re-introduces resistance, the value of current traversing the coil 6 is so decreased as to prevent the coil 6 from remaining energized to a degree that is sufficient to maintain the interrupter open, the interrupter 5 recloses, and the heating element 2 is re-energized to reheat the device 1 to maintain the temperature thereof at a predetermined value.

By using various salts having a melting point of approximately the temperature at which the heat-storage device 1 is to be maintained, regulation of that temperature may be normally maintained within desired practical limits.

For the thermostat illustrated, I prefer to employ a mixture of lithium and potassium carbonates by means of which I obtain an operating temperature of approximately 750° F.

My invention is not limited to the specific salts that are mentioned, or to the particular arrangement of the various elements that are illustrated, since various modifications may be made in the construction without departing from the spirit and scope of the invention, as set forth in the appended claims.

I claim as my invention:

1. A thermally-actuable means for an electrically-heated device, comprising an elongated metal casing closed at one end, a material filling said casing that is electrically non-conducting at normal temperatures and becomes electrically conducting at predetermined higher temperatures, a contact terminal within said material, and means for so mounting said casing relatively to a heated device with which it is operatively associated, that a predetermined end portion only is directly subjected to the heat of said device.

2. A thermally-actuable means for a heated device, comprising an elongated metal tube closed at one end, a material filling said tube that is electrically non-conducting at normal temperatures and becomes electrically conducting at predetermined higher temperatures, an elongated contact member within said filling substantially coextensive with said metal tube, and means for so supporting said tube on a heated device with which it is operatively associated, that the closed end only is directly subjected to the heat of said device.

3. A thermally-actuable means for a heated container, said means comprising an elongated metal tube closed at one end, a material filling said tube that is electrically non-conducting at normal temperatures and becomes electrically conducting at predetermined higher temperatures, an elongated contact member within said filling, substantially coextensive with said metal tube, and means for so supporting said tube relatively to the bottom of a container with which it is operatively associated, that the open end of the tube extends downwardly from and below the bottom of said container.

In testimony whereof, I have hereunto subscribed my name this 11th day of July, 1921.

ALLIS M. MacFARLAND.